March 19, 1968  J. M. STEWART ET AL  3,373,877
FILTER DEVICE

Filed Sept. 22, 1964  3 Sheets-Sheet 1

INVENTORS
JAMES M. STEWART
SARK PASHAIAN
PAUL N. ROMACK
ORLAN M. ARNOLD
BY
Curtis, Morris & Safford
ATTORNEYS

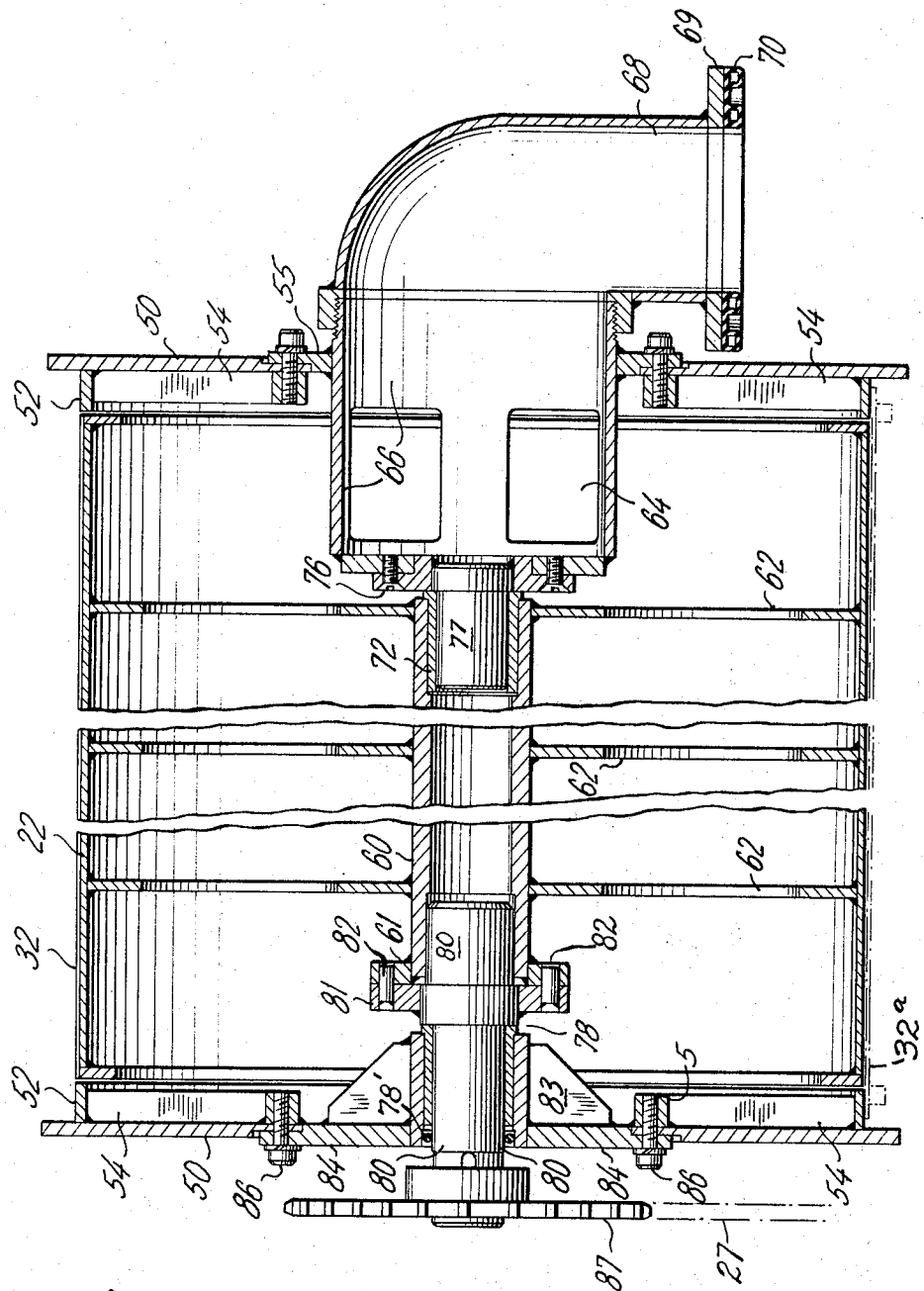

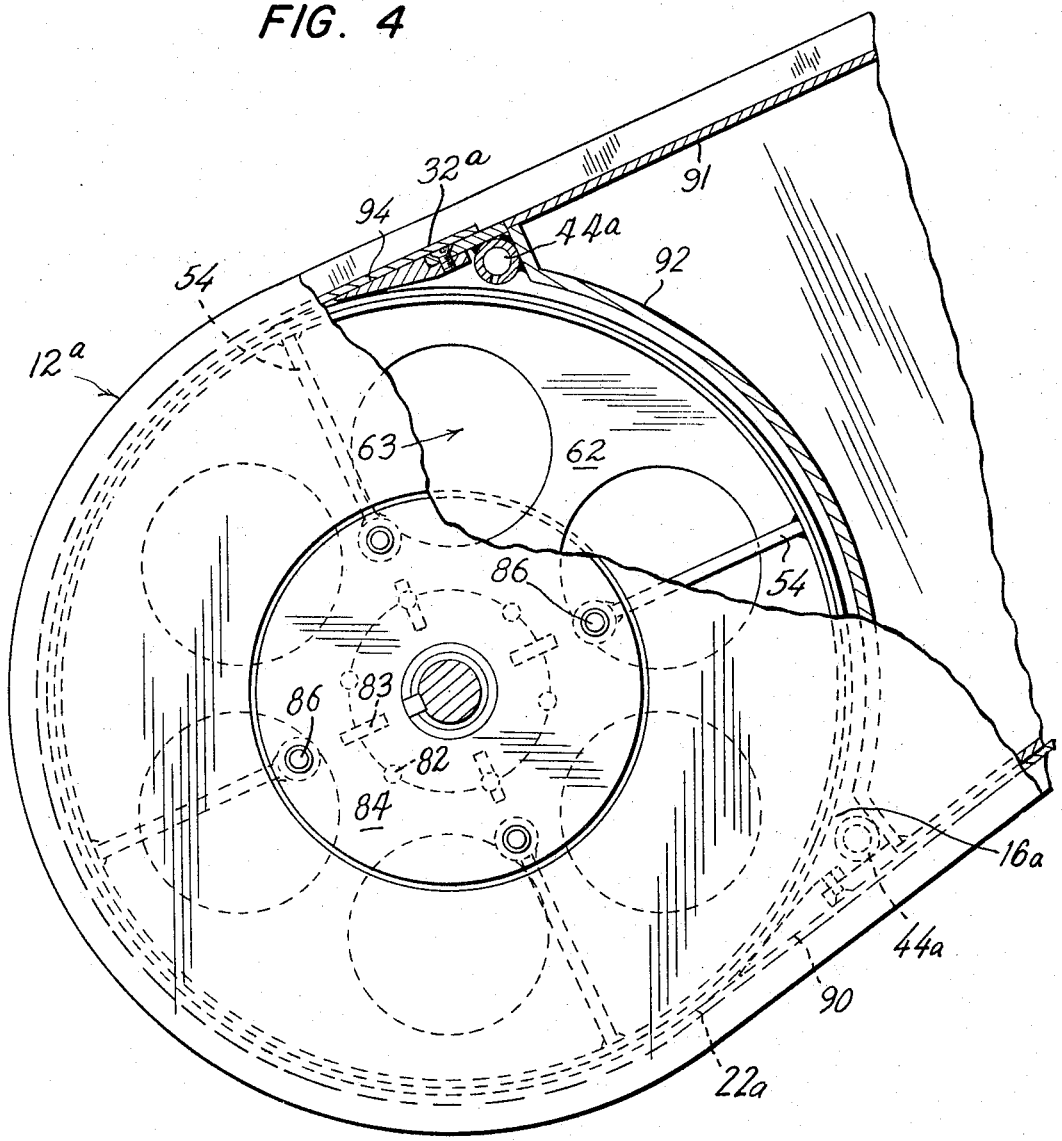

United States Patent Office 3,373,877
Patented Mar. 19, 1968

3,373,877
FILTER DEVICE
James M. Stewart, Dearborn, and Sark Pashaian, Monroe, Mich., and Paul N. Romack, Youngstown, Ohio, and Orlan M. Arnold, Grosse Pointe Park, Mich., assignors to Ajem Laboratories, Inc., Livonia, Mich.
Filed Sept. 22, 1964, Ser. No. 398,446
2 Claims. (Cl. 210—401)

ABSTRACT OF THE DISCLOSURE

A filter assembly having a rotatable permeable drum and a filter medium transporting means to carry filter medium over the permeable surface of the drum, and a suction connection to the interior of the drum. The assembly being movably mounted so as to dip into a tank of filterable liquid. The drum being rotatably and slidably mounted on stub shafts on the assembly frame at either end, so that the drum is rotatably and removeably positioned.

This invention relates to filtration apparatus and more particularly to novel filtration apparatus comprising filtering means of high capacity.

Filtration equipment that can be operated as nearly to continuously as possible is important. For example, in many industrial processing situations, it is undesirable to discard liquids after a single use. This is sometimes because of direct economic considerations; for example, when the liquid is a relatively expensive cooling oil contaminated by dirt, and sometimes because of more indirect considerations; for example, the desire to avoid capital expenditure for more water supply lines or the necessity induced by restricting local supply or the necessity of avoiding pollution by discharging waste, of preserving water.

In such continuous filtration operations, it is important to have a filter that may be operated as long as possible without excessive downtime for cleaning, advancing new filter medium, etc. Unless such downtime can be avoided, it may be necessary, during the filter shut-down period, to shut down also the processing operation to which the filtered liquid is being recycled, or to provide an auxiliary filtration unit, or to provide a storage unit maintaining a reservoir of prefiltered liquid. These methods of mitigating the effects of discontinuous filtration required increased capital investment for greater plant floor space and for the addition of equipment involved. Furthermore, frequent shutting down and starting up of suction pumps cause excessive wear on the pumps. Thus, it is important to have trouble-free, continuous filtration equipment capable of smooth operation and capable of continuously supplying filter fluid for various processes.

The object of this invention is to provide filtration apparatus having improved liquid sealing means. Another object of the invention is to provide apparatus having a high degree of cooperation between elements, thus allowing simplicity of structure and consequent ease of assembly and disassembly. It is another object of the invention to provide filtration apparatus having a high capacity for handling both liquid to be cleaned and sludge and dirt separated from said liquid by the filtering action. It is a further object of the invention to provide apparatus for requiring relatively little downtime for maintenance such as cleaning, etc. It is still another object of the invention to provide a unique construction of said filter apparatus, which allows quick assembly and disassembly of the apparatus, and allows the apparatus to be used in various positions.

The apparatus of the instant invention achieves the objects set forth above. Applicants' apparatus comprises a drum-type filter element wherein only the cylindrical section rotates. The ends of the cylinder, i.e. the heads of the cylinder drum, remain stationary in position but in such relationship to the rotating cylinder and filter media as to provide an adequate seal against dirty liquid. Filter media are fed, either continuously or serially for disposal from a roll of clean filter medium across a filter face of a filtered drum and carried around the filter drum by rotation of the drum and guided into a continuous media conveyor which carries the dirty media to a cleaning or disposal area.

The drum and media conveyor assemblies are advantageously pivotally mounted to swing out of the dirty liquid providing easy access for maintenance. Furthermore, to facilitate the disassembly of the drum, ducts through which filtered liquid is carried from the inner portion of the drums through the tank of the dirty liquid are adapted for quick disconnection. This is advantageously carried out by having substantially horizontal flange connections of these ducts that are gasketed with a resilient material, and which may be held closed by bolts or by the weight of the filtration equipment.

Gate valves or slide plates are not shown in the drawings, may be provided to close off such ducts when the apparatus is swung up for servicing etc., and thus prevent flooding of dirty liquid into the ducts for handling filtered liquid.

In this application and accompanying drawings we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In the drawings:

FIGURE 3 shows the section of the drum, showing its unique but simple assembly which provides means for rapid dismantling of the equipment.

FIGURE 4 is an elevational view, partially in section, wherein two wash pipes and separated ramps for filter medium are required within a single assembly for optimum operational convenience.

Figure 1:
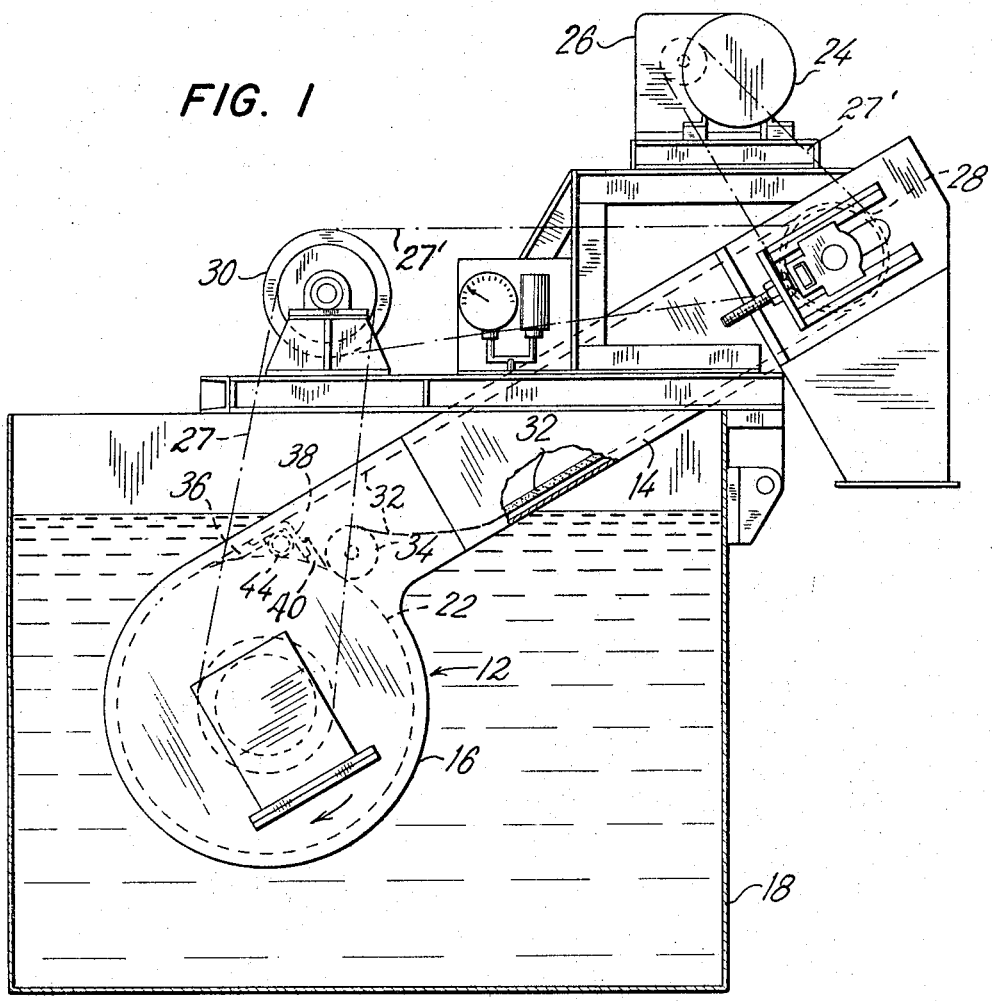
FIGURE 1 is a side elevational view of a filter apparatus in a tank of which a side wall is broken away, to expose interior parts.
Figure 2:
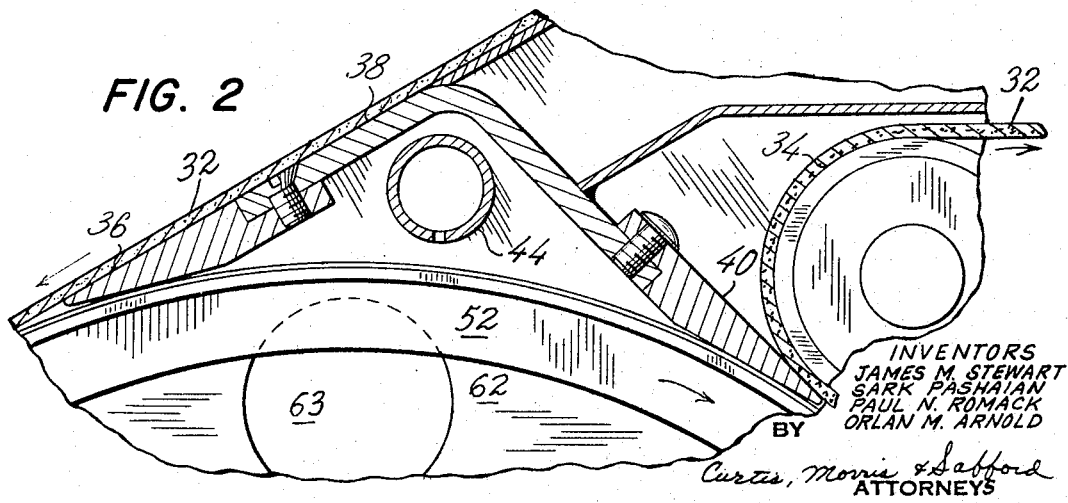
FIGURE 2 is an elevational view showing the seal and filter medium take-off-assist assembly in greater detail.

Referring to FIGURE 1, filter assembly 12, comprising media conveyor section 14 and drum 16, is placed in a tank 18 of dirty liquid in such a way that the entire drum is beneath the surface of dirty liquid. To provide for differential speed between rotating cylinder 22 of drum 16, and pulley 28, motor 24 is attached to each of these elements through speed reducer 26 and sprockets and chains 27, 27' and 27". The differential speed is helpful in maintaining proper tracking for the filter medium. Sprocket 30 is used to decrease the peripheral speed of cylinder 22, to a slower rate than the peripheral speed of the pulley 28. In practice, a continuous filter media 32 is carried down the lower side of media conveyor section 14, around idler roll 34, onto cylinder 22, and carried clockwise therearound until it is lifted off the cylinder at ramp 36 of seal assembly 38. This seal assembly 38 is seen in more detail in FIGURE 2. The seal assembly has attached thereto ramps 36 and 40 for aiding in placing the filter medium on and lifting the filter media off cylinder 22. It also comprises means 44 by which fluid may be introduced to wash the drum as it rotates beneath the seal assembly. When this wash water is introduced to jets in wash pipe 44, it not only provides convenient means for washing continuously cylinder 22, but also provides a means for maintaining a positive pressure under the seal assembly 38, and thereby contributes to keeping the filter media from being sucker apart in the nip, between seal head ramp 40 and cylinder 22.

The particularly unique construction of drum 16 is best seen in FIGURE 3:

On the inside of stationary side frames 50 are seal rings 52. These rings are machined to the same diameter as that of filter cylinder 22, thus providing a smooth surface over which wide filter media may travel. Clearance of $1/16$ of an inch exists between cylinder 22 and seal rings 52. Extending from seal ring 52 are radial support ribs 54. These ribs structurally reinforce side frames 50 and give support to seal rings 52, and form at their terminal, a hole for receiving bolts.

Cylinder 22 is supported on an axle 60 and perforated support discs 62, radially positioned between axle 60 and cylinder 22. The perforations 63 are necessary in order to provide proper flow path for liquid which is pulled in by suction through the filter media and drum 22 to a pump not shown in the drawings.

The filtered liquid leaves the filter drum through ports 64, and inner duct 66. Outer duct 68 terminates at flange 69 covered with a resilient gasket 70 which is attached to piping not shown, which piping provides a path for carrying the liquid to the operation in which it is to be used.

Axle 60 is supported on suction side of drum on a stationary hardened steel shaft assembly 77 having a stub shaft bolted to the end of duct 66 by bolts 76. This stub shaft is slidable into tubular axle 60 as shown, and rotates on a bearing bushing 72 located in axle 60. The entire shaft assembly is then bolted to the side frame 50, by bolts 53 in threaded bolt holes in the ribs 54. Step edge disc 55 welded to inner duct 66 positions the side frame 50 on the duct assembly.

Axle 60 on drive side of drum is supported and driven by drive shaft 80, which turns in a stationary bearing 78 located in tubular boss 83 in the stepped edged disc 84. Shaft 80 is angularly positioned by means of positioning pins 82 joining flanged section 81 of shaft 80 to the axle flange 61 for transmission of torque.

Liquid seal 78' is positioned outwards of bearing 78 on shaft 80. The step edged disc 84 serves to attach the shaft assembly to the side frame with bolts 86. The drive sprocket 87 is attached to shaft 80.

Not only does this assembly allow rapid assembly and disassembly but it also makes the filter equipment highly versatile. For example, the suction and drive sides may be alternated; so that the equipment may be utilized in a number of positions in various parts of a manufacturing plant.

During the filtration operation, the filter media 32 may overlap the ring 52 and thus help provide the necessary sealing between ring 52 and cylinder 22.

Turning to FIGURE 4, another embodiment of the invention is shown. In this embodiment, the idler roll 34 has been omitted and the filter medium 32a and filter medium guide belts, such as those disclosed in U.S. Patent No. 3,307,704 by Pashaian and Stewart, ride on the support plate 91. The dot-dash lines at the bottom of FIGURE 3 illustrate how the belt of our prior patent may be used with the present invention.

In this embodiment of the invention, the filter media 32a is carried directly down the media conveyor section and onto cylinder 22a on ramp 94 of seal assembly 92. Seal assembly 92 covers the entire area of the drum not covered by the filter media, and terminates at each end with ramp sections 90 and 94. Wash pipes 44a are positioned beneath each extremity of the seal, to provide multi-angle wash capability and thus improve the effectiveness of the washing operation. Drum 16a is mounted in the same manner that drum 16 of FIGURE 1 is mounted, i.e. as described in connection with FIGURE 3.

Cylinders 22 and 22a are constructed of materials known to the art which will provide the requisite corrosion resistance for the particular filtration operation which is to be carried out. These drums usually have open areas of from 40 to 60% of the total surface area, but the open areas may be greater or smaller as special conditions require. The gauge of the material may be great or small, depending upon the materials of construction. For example, plastic cylinders constructed of polypropylene or polyvinylchloride would normally be of greater thickness than those constructed of steel or nickel alloys.

The segmented construction of the drum is such that the same basic filtration apparatus may be used for different corrosion resistance. For example, the side frame and the drum may be made of plastic materials but may be replaced by side frames and drums made of metal materials, for example, when the filtration operation switches from handling corrosive aqueous solutions to the handling of aromatic solvents.

We claim:

1. A filter apparatus having a drum-type assembly comprising a fenestrated cylinder, an axle thereof, fenestrated support members radially mounted between said axle and said drum type assembly, stationary frame members mounted at each end of said cylinder and spaced apart from each end of said cylinder in close proximity thereto, stub shafts slidably connected to the respective ends of said axle and forming means for supporting and rotating said cylinder, driving means operatively connected to one said shaft, duct means providing a fluid conduit attached to the other said shaft, said shafts being attached to said stationary frame members and slidably interfitted with said axle, at least one of the shafts having a torque connection with said cylinder for effecting rotation thereof, said shafts forming the only fixed connection between the stationary frame members and the rotatable cylinder and axle so that the cylinder is removably connected to the stationary frame members and wherein said drive means and said duct means are removeably connected to said stationary frame members mounted at each end of said cylinder to provide for rapid assembly and disassembly of the filter apparatus.

2. A filter apparatus having a drum-type assembly comprising a fenestrated cylinder, a filter media conveyor section, filter media mounted on said apparatus for serial passage over said conveyor section and said cylinder, said cylinder having an axle, stationary frame members mounted at each end of said cylinder and spaced apart from each end of said cylinder in close proximity thereto, demonstrated support members radially mounted between said axle and the frame, stub shafts slidably connected to each end of said axle and at least one having a torque connection with said cylinder for effecting rotation thereof, driving means operatively connected to one said stub shaft, said shafts forming the only fixed connection between the stationary frame members and the rotatable cylinder and axle so that the cylinder is removably connected to the stationary frame members, duct means providing a fluid conduit attached to the other said shaft, said shafts being removably attached to said duct means and said drive means, said drive means and said duct means being removeably connected to said stationary frame members mounted at each end of said cylinder to provide means for rapid assembly and disassembly of the filter apparatus.

References Cited

UNITED STATES PATENTS

| | | | |
|---|---|---|---|
| 165,637 | 7/1875 | Watson et al. | 210—401 |
| 606,453 | 6/1898 | Fryer | 210—402 |
| 736,596 | 8/1903 | Grondahl | 210—401 X |
| 775,475 | 11/1904 | Mehnert et al. | 210—401 |
| 1,882,178 | 10/1932 | Cumberland | 210—402 |
| 2,027,652 | 1/1936 | Raisch | 210—77 |
| 2,197,610 | 4/1940 | Fedeler | 210—401 X |
| 2,751,086 | 6/1956 | Borjeson | 210—402 X |
| 2,899,068 | 8/1959 | King et al. | 210—402 |

SAMIH N. ZAHARNA, *Primary Examiner.*

REUBEN FRIEDMAN, *Examiner.*

C. DITLOW, *Assistant Examiner.*